US010239675B2

(12) United States Patent
Choi et al.

(10) Patent No.: US 10,239,675 B2
(45) Date of Patent: Mar. 26, 2019

(54) INTEGRATED PRODUCT SCOOP OR DISPENSER HOLDER OR CLIP, METHODS OF PRODUCTION AND USES THEREOF

(71) Applicant: Red Forest Tech, LLC, Foothill Ranch, CA (US)

(72) Inventors: Won J Choi, Foothill Ranch, CA (US); Evgeny Trufkin, Foothill Ranch, CA (US)

( * ) Notice: Subject to any disclaimer, the term of this patent is extended or adjusted under 35 U.S.C. 154(b) by 0 days.

(21) Appl. No.: 14/702,217

(22) Filed: May 1, 2015

(65) Prior Publication Data

US 2016/0318676 A1 Nov. 3, 2016

(51) Int. Cl.
| B65D 41/56 | (2006.01) |
| B65D 51/00 | (2006.01) |
| B65D 51/24 | (2006.01) |
| G01F 19/00 | (2006.01) |
| B65D 77/24 | (2006.01) |

(52) U.S. Cl.
CPC ......... B65D 51/246 (2013.01); B65D 77/245 (2013.01); G01F 19/002 (2013.01)

(58) Field of Classification Search
CPC .... A47G 19/02; B65D 51/246; Y10T 24/309; B67B 7/00; B05C 5/0225; G01F 19/002
USPC ........ 220/212, 574.1, 697; 24/455, 456, 459
See application file for complete search history.

(56) References Cited

U.S. PATENT DOCUMENTS

| 3,941,237 | A | * | 3/1976 | MacGregor, Jr. ......... B08B 9/28 198/690.1 |
| 5,482,095 | A | * | 1/1996 | de Chollet ........... B65D 77/245 141/18 |
| 7,040,500 | B2 | | 5/2006 | Kipperman |
| 8,042,704 | B2 | * | 10/2011 | Borowski ............... A47J 47/01 220/212 |
| D661,588 | S | * | 6/2012 | Irani .............................. D9/449 |
| 8,627,981 | B2 | * | 1/2014 | Perry ................. B65D 25/2897 206/553 |
| 9,090,391 | B2 | * | 7/2015 | Horton ............... B65D 21/0222 |
| 9,387,963 | B2 | * | 7/2016 | McBroom ........... B65D 43/169 |

(Continued)

FOREIGN PATENT DOCUMENTS

| EP | 2527265 | 11/2012 |
| JP | H08 301288 | 11/1996 |

OTHER PUBLICATIONS

Search Report and Written Opinion issued by WIPO dated Jun. 30, 2016.

*Primary Examiner* — Rafael A Ortiz
(74) *Attorney, Agent, or Firm* — Sandra Thompson; Finlayson Toffer Roosevelt & Lilly, LLP

(57) ABSTRACT

An integrated product scoop or dispenser holder arrangement is disclosed and described in detail that includes: a) a container for retaining product, wherein the container comprises a body component having an interior surface, an exterior surface, a top, a bottom, an opening in or near the top of the container and a lid, b) a product retained in the container, c) an integrated product scoop or dispenser holder that is physically integrated into the material used to form the container, is located as a part of the interior surface of the container, and is designed to hold or retain a scoop or dispenser, and d) a scoop or dispenser that releasably mates with the integrated product scoop or dispenser holder in order to form the integrated product scoop or dispenser holder arrangement.

14 Claims, 4 Drawing Sheets

(56) References Cited

U.S. PATENT DOCUMENTS

| | | | |
|---|---|---|---|
| 2006/0156811 A1 | 7/2006 | Borowski | |
| 2008/0196222 A1* | 8/2008 | Park | F16B 5/0614 24/530 |
| 2010/0308065 A1* | 12/2010 | Vandamme | B65D 43/169 220/697 |
| 2014/0131355 A1* | 5/2014 | Jentis | B65D 43/169 220/212 |

* cited by examiner

FIG. 1
PRIOR ART
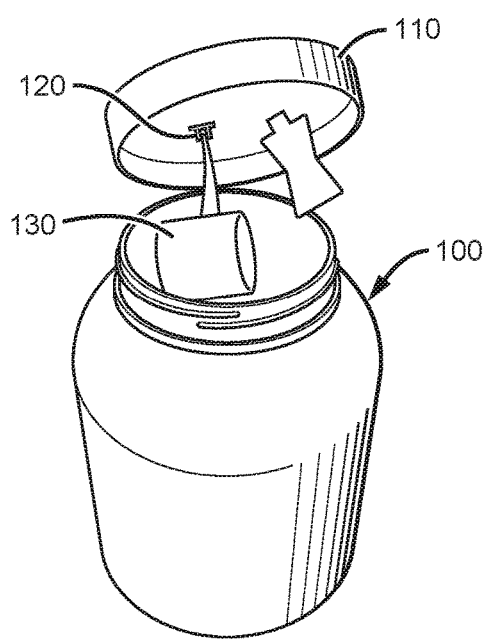
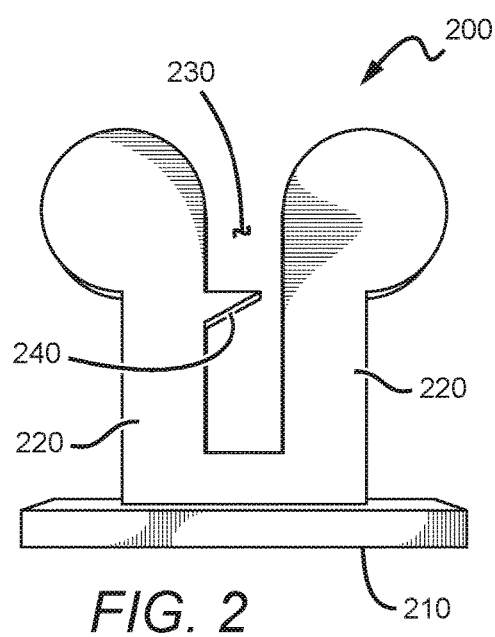
FIG. 2
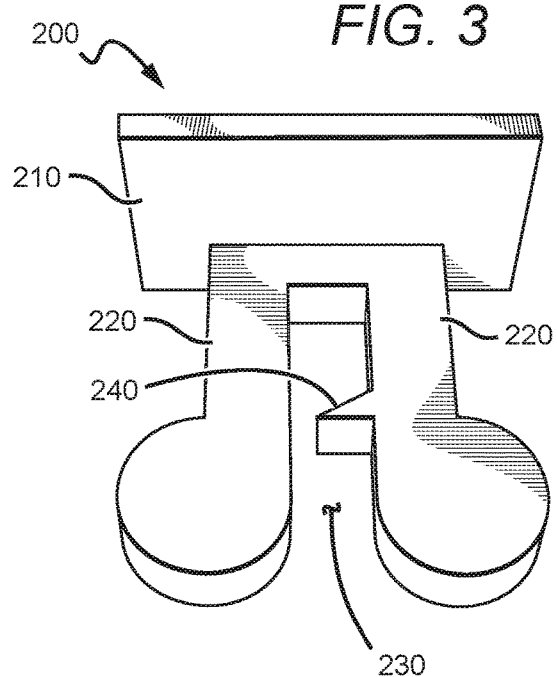
FIG. 3

INTEGRATED PRODUCT SCOOP OR DISPENSER HOLDER OR CLIP, METHODS OF PRODUCTION AND USES THEREOF

FIELD OF THE SUBJECT MATTER

The field of the subject matter is integrated product scoops or dispenser holders or clips, methods of production and uses thereof.

BACKGROUND

There are a number of consumer products that come with separate or independent scoops or dispensers as a part of the product. Some of these products include protein powder, flour, sugar, laundry or dishwasher detergent, infant formula, powdered drinks and milk, rice and many other dry consumer products. In many of these products, the scoop is either not included with the product or buried under the product. If it is buried under the product, then the consumer has to dig into the product in search of the scoop or use an old scoop, until the new one surfaces. In this instance, if it is a food product, it can be unsanitary and adulterate the product.

A number of innovators have tried to solve this problem. One product called a "Protein Powder Scoop Clip" can be found at Amazon.com (ASIN Product No.: B00B7SIPUQ) and is shown in Prior Art FIG. 1. The product container 100 and lid 110 are shown where a scoop clip 120 is adhesively and, in some instances, removably attached to the lid 110. The scoop clip 120 is used to hold the scoop 130.

The description states: "This product is a small plastic clip that holds a variety of scoops for protein powders, drink mix powders, supplement powders, rice, grains, etc. The clip measures 1 cm×1 cm×1 cm, it has an adhesive layer on the bottom, with which the user can adhere the product anywhere, ideally on the underside of the container lid, or anywhere else in the container. The purpose of this clip is to prevent the users hands from contaminating the contents of the container, helping the user more easily find the scoop, preventing it from being "buried" in the contents, and preventing the contents from getting on the user's hands. Clips are sold in packs of 5." There are a number of problems with this product. First, it is self-described as a "choking hazard" for children under 3 years old. Second, it is utilized, as stated above, by being adhered to the inside of the container. It is likely that the powdered product will be drawn to the adhesive layer, as well, and will likely clog up around the base of the clip. Third, the problem of initially finding the scoop isn't solved by this design, because the clip is provided to be used with the scoop or dispenser included in the product. So, the consumer still has to dig around in the product to find the scoop, if it is not found on top of the powdered product. And finally, because the clip is held inside the container with a standard adhesive layer or tape, if the product gets hot during shipment or storage, the adhesive layer could breakdown and cause the clip to fall into the product.

U.S. Pat. No. 8,727,149 issued to Reid et al discloses a scoop and lid arrangement, wherein the scoop is designed to fit into or onto a ledge that is designed as part of the container opening. The lid then is designed to screw onto the container and over the scoop. A liner then separates the scoop from the product, until the product is opened. After that, the inventors state that the consumer "can simply place the scoop on top of the powder between uses", and that "the problem of objectionable sinking down into the powder occurs only during shipment". While this may be true, a consumer doesn't want to reach down into the powder with wet hands to pick up a scoop lying on top of the powder. Also, if you take the powder out of the cabinet and drop it on the floor, for example, then the scoop may very well become covered again. Finally, if the container is large—such as is the case with protein powders—as the powder is used, the consumer has to reach further down inside the container to retrieve it.

US Patent Publication 20140202917 to Erlebach discloses a scoop holder that is secured to an insert that is fit inside of the lid of a product container. This again requires a special fitting inside the lid that can catch powder between the insert and the lid itself. Also, anchoring the clip on the lid means that when the container is full, the scoop could create a problem by turning in the powder and causing drag on the lid when it is turned to open. When the lid is opened and pulled away from the container, the scoop may then have some product in it that will also be pulled away and possibly spilled. U.S. Pat. No. 8,590,732 solves part of the problem by securing the scoop in a clip up against the lid, but there still could be problems with powder collecting up in the scoop area, such that powder is spilled out of the lid when the container is opened. In addition, this patent also considers the option where the clip components would breakaway after the scoop is removed for the first time, which could cause the clip components to fall into the product and have to be retrieved. There are a number of patents that contemplate attaching the scoop inside the lid, including U.S. Pat. No. 8,469,223, U.S. Pat. No. 7,040,500, US Patent Publication No.: 20080156805, and none of these solutions solve the problems outlined herein.

To this end, it would be desirable to produce an integrated product scoop and dispenser holder arrangement that addresses the following goals: a) is integrated into the inside of the product container as the container is formed, so that there is no adhesive residue or chance of holder/clip breakaway, b) is located on the inside of the container near the top of the container, but is not located as a part of the lid, c) can be made of any type of material, as long as the material is capable of reliably holding a product scoop or dispenser, as it is used and replaced back onto the holder arrangement, d) is safe for children to use, and e) is provided in the product container when it is produced and purchased, such that the scoop or dispenser is secured and can be easily found when the product container is first opened.

SUMMARY OF THE SUBJECT MATTER

An integrated product scoop or dispenser holder arrangement is disclosed and described in detail that includes: a) a container for retaining product, wherein the container comprises a body component having an interior surface, an exterior surface, a top, a bottom, an opening in or near the top of the container and a lid, b) a product retained in the container, c) an integrated product scoop or dispenser holder that is physically integrated into the material or layers of material used to form the container, is located as a part of the interior surface of the container, and is designed to hold or retain a scoop or dispenser, and d) a scoop or dispenser that releasably mates with the integrated product scoop or dispenser holder in order to form the integrated product scoop or dispenser holder arrangement.

In another embodiment, a product scoop or dispenser holder arrangement is disclosed and described in detail that includes: a) an integrated product scoop or dispenser holder that is physically integrated into a material or layers of material used to form a product container, is located as a part of an interior surface of the container, is not located as a part of a lid for the container, and is designed to hold a scoop or dispenser, and b) a scoop or dispenser that releasably mates with the integrated product scoop or dispenser holder in order to form the integrated product scoop or dispenser holder arrangement.

BRIEF DESCRIPTION OF THE FIGURES

Prior Art FIG. 1 shows a conventional scoop clip that is designed to be adhered to the inside of a product container lid to hold the scoop that is incorporated with the original product.

FIG. 2 shows a contemplated embodiment of an integrated product scoop or dispenser holder arrangement.

FIG. 3 shows a contemplated embodiment of an integrated product scoop or dispenser holder arrangement.

DETAILED DESCRIPTION

An integrated product scoop and dispenser holder arrangement has now been developed that addresses the following goals: a) is integrated into the inside of the product container as the container is formed, so that there is no adhesive residue or chance of holder/clip breakaway, b) is located on the inside of the container near the top of the container, but is not located as a part of the lid, c) can be made of any type of material, as long as the material is capable of reliably holding a product scoop or dispenser, as it is used and replaced back onto the holder arrangement, d) is safe for children to use, and e) is provided in the product container when it is produced and purchased, such that the scoop or dispenser is secured and can be easily found when the product container is first opened. It is also important that a contemplated integrated product scoop and dispenser holder is located above any product that is in the container, the intended product line or level, or a combination thereof.

Figure 4:
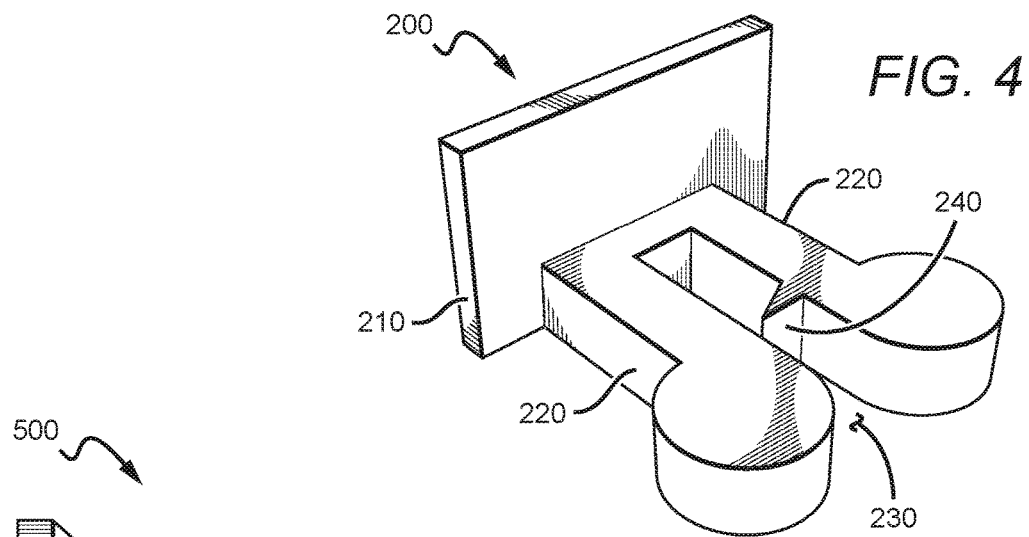
FIG. 4 shows a contemplated embodiment of an integrated product scoop or dispenser holder arrangement.

Specifically, an integrated product scoop or dispenser holder arrangement is disclosed, shown in FIGS. 2-4 and described in detail that includes: a) a container for retaining product, wherein the container comprises a body component having an interior surface, an exterior surface, a top, a bottom, an opening in or near the top of the container and a lid, b) a product retained in the container, c) an integrated product scoop or dispenser holder that is physically integrated into the material or layers of material used to form the container, is located as a part of the interior surface of the container, and is designed to hold or retain a scoop or dispenser, and d) a scoop or dispenser that releasably mates with the integrated product scoop or dispenser holder in order to form the integrated product scoop or dispenser holder arrangement. In some embodiments, the integrated product scoop or dispenser holder is designed to grasp or actively secure the scoop or dispenser. In other embodiments, the product scoop or dispenser is designed to actively attach to the integrated product scoop or dispenser holder arrangement. In some embodiments, the scoop comprises a handle and wherein a portion of the handle hooks over onto the product scoop or dispenser holder to releasably mate with the holder.

FIGS. 2-4 show different views of a contemplated integrated product scoop or dispenser holder 200, wherein the holder is integrated into the container wall 210 and comprises a directional channel 230 formed by two parallel arms 220 where the scoop (not shown) can be guided into the holder and a backstop 240 that is designed to secure the scoop in the directional channel 230 until actively removed by the consumer.

Figure 5:
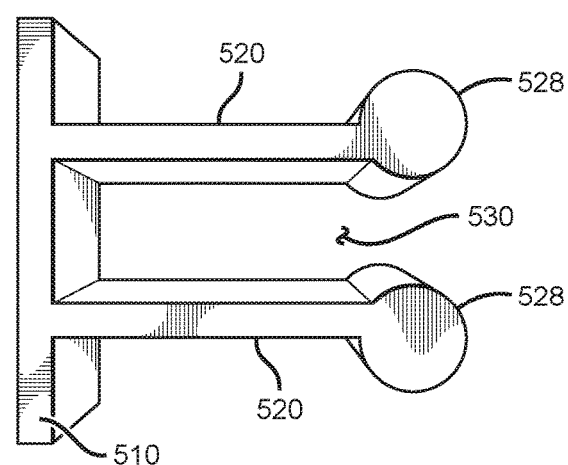
FIG. 5 shows a contemplated embodiment of an integrated product scoop or dispenser holder arrangement.
Figure 6:
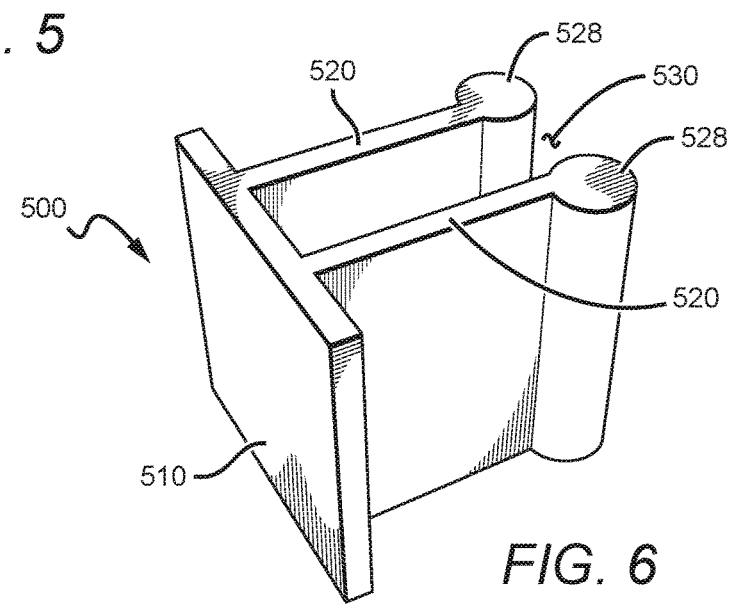
FIG. 6 shows a contemplated embodiment of an integrated product scoop or dispenser holder arrangement.
Figure 7:
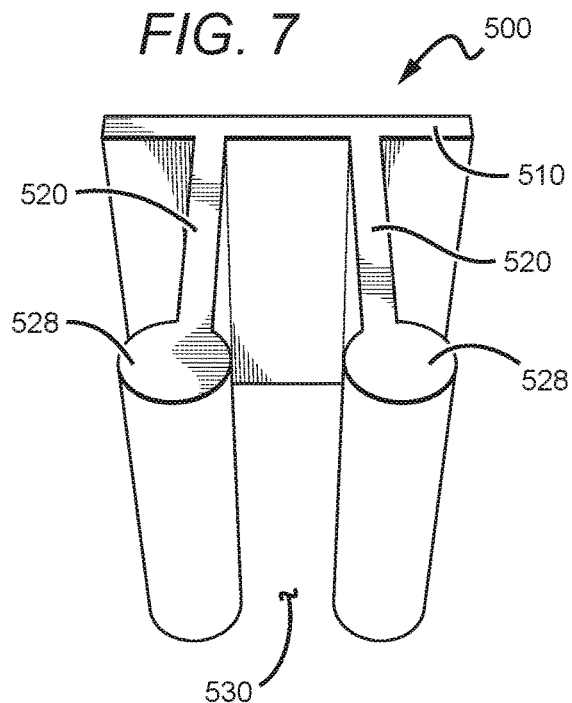
FIG. 7 shows a contemplated embodiment of an integrated product scoop or dispenser holder arrangement.

FIGS. 5-7 show different views of a contemplated integrated product scoop or dispenser holder 500, wherein the holder is integrated into the container wall 510 and comprises a directional channel 530 formed by two parallel arms 520 where the scoop (not shown) can be guided into the holder and endcaps 528 that are designed to secure the scoop in the directional channel 530 until actively removed by the consumer.

Figure 8:
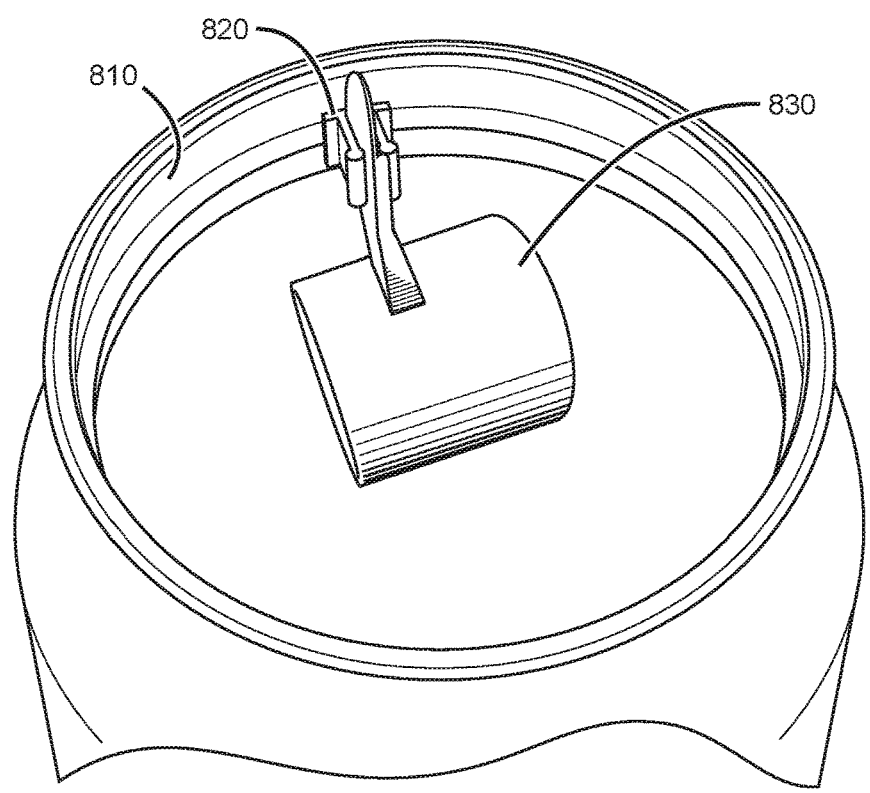
FIG. 8 shows a contemplated embodiment of an integrated product scoop or dispenser holder arrangement.
Figure 9:
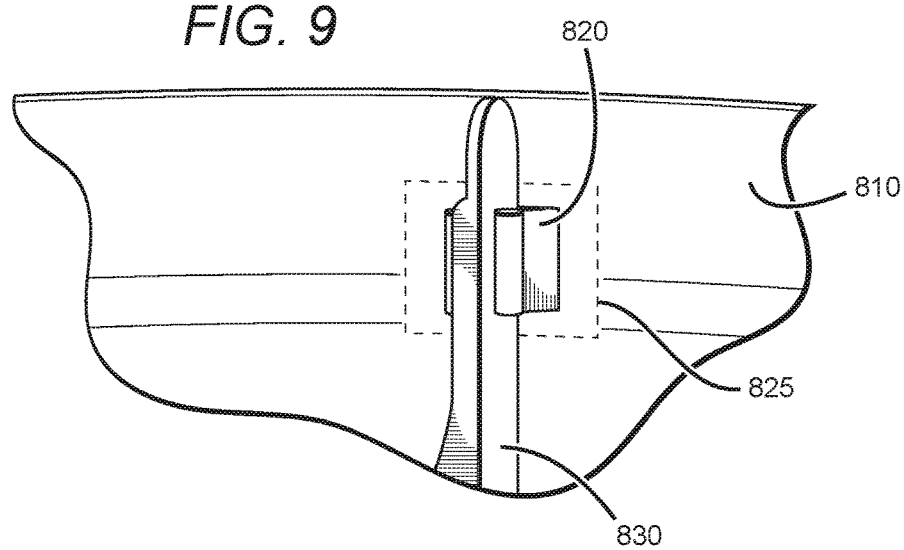
FIG. 9 shows a contemplated embodiment of an integrated product scoop or dispenser holder arrangement.

In another embodiment that is shown in FIG. 8 and FIG. 9, a product scoop or dispenser holder arrangement is disclosed and described in detail that includes: a) an integrated product scoop or dispenser holder 820 that is physically integrated (the back of the integrated holder 820 is shown as a broken line 825 to represent that it cannot be outwardly seen on the surface of the container 810) into a material used to form a product container 810, is located as a part of an interior surface of the container 810, is not located as a part of a lid for the container, and is designed to hold a scoop or dispenser 830, and b) a scoop or dispenser 830 that releasably mates with the integrated product scoop or dispenser holder 820 in order to form the integrated product scoop or dispenser holder arrangement.

In contemplated embodiments, an integrated product scoop or dispenser holder arrangement includes the term "integrated" because the holder is formed as a part of the container. Contemplated embodiments do not include those holders that are adhered as a separate component to the surface of the inside of a container, for many of the reasons outlined in the Background Section. A contemplated integrated product scoop or dispenser holder arrangement comprises a holder that is integrally molded as a part of the container when the container is formed. In another embodiment, a contemplated holder may be hot affixed to the inside of the container, so that the material that makes up the container and the material that make up the holder integrate with one another, so as to appear physically integrated. An example of this would be where the container is formed from a plastic material. The holder is formed from the same or a similar plastic material that is heated and affixed to the inside of the container. In this embodiment, the polymer molecules from the container material and the polymer molecules from the holder material blend with one another at the point of affixation, so that it appears that it was molded as one piece.

Figure 10:
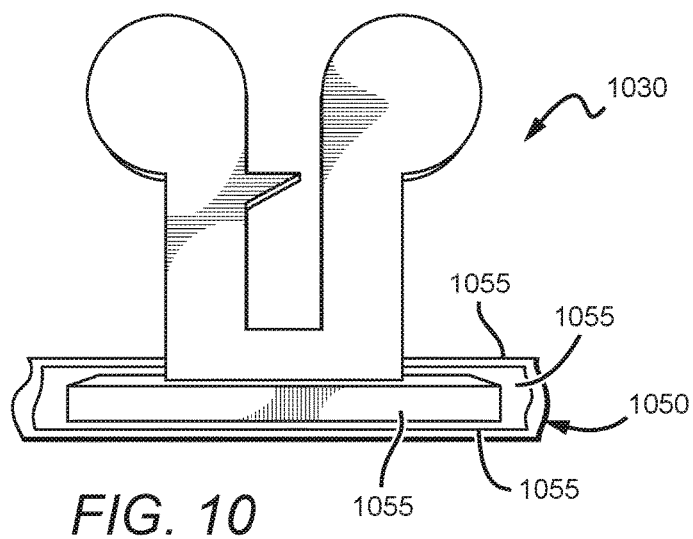
FIG. 10 shows a contemplated holder 1030, wherein the holder is integrated into a layered material 1050 comprising several layers 1055.

Another contemplated embodiment may be where the holder is held into place by being integrated into layers of material that make up the container walls. An example may be a cardboard container that is regularly used to hold a dry product like laundry detergent. In these embodiments, the product scoop or dispenser holder may be integrated into the layers of cardboard as they are manufactured. In a similar fashion, for products that come in cans, such as infant formula, where the can is built from several layers of material, the product scoop or dispenser holder is integrated into the layers of material making up the can walls. In all of these instances, it should be understood that the product scoop or dispenser holder is not adhered or affixed with adhesive to the inside surface of the container. FIG. 10 shows a contemplated holder 1030, wherein the holder is integrated into a layered material 1050 comprising several layers 1055

The integrated product scoop or dispenser holder may comprise at least one type of material and in some embodiments, may comprise more than one type of material. A contemplated integrated product scoop or dispenser holder may comprise hard plastic, flexible plastic, metal, cardboard, coated materials, layered materials or a combination thereof. The materials that make up the integrated product scoop or dispenser holder do not have to be the same materials that make up the product container.

Figure 11:
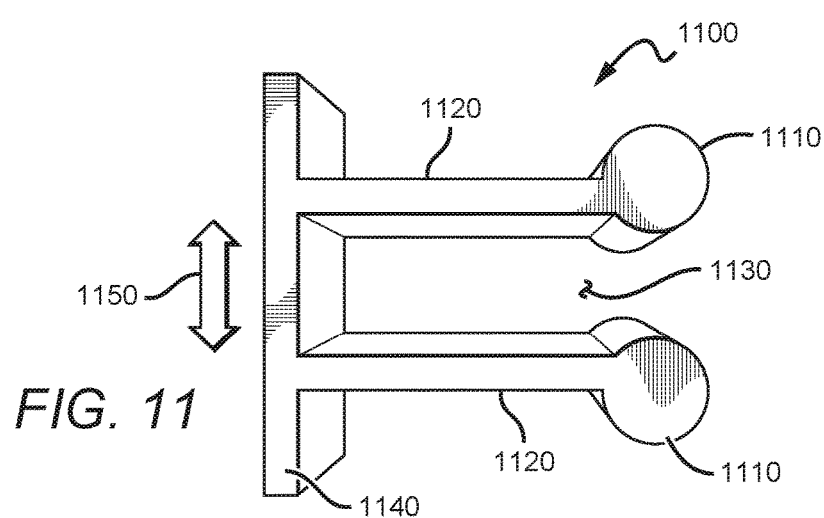
FIG. 11 shows how a product scoop or dispenser holder may be aligned in a vertical orientation 1150, wherein the holder is integrated into the container wall 1140 and comprises a directional channel 1130 formed by two parallel arms 1120 where the scoop (not shown) can be guided into the holder and endcaps 1110 that are designed to secure the scoop in the directional channel 1130 until actively removed by the consumer.

The integrated product scoop or dispenser may be aligned in a flat orientation with respect to the product container wall. In some embodiments, the integrated product scoop or dispenser holder may be aligned in a vertical orientation with respect to the product container wall, so that the scoop is hung onto the holder. FIG. 11 shows how a product scoop or dispenser holder may be aligned in a vertical orientation 1150, wherein the holder is integrated into the container wall 1140 and comprises a directional channel 1130 formed by two parallel arms 1120 where the scoop (not shown) can be guided into the holder and endcaps 1110 that are designed to secure the scoop in the directional channel 1130 until actively removed by the consumer.

Contemplated product scoop or dispenser holder arrangements can be used where the product comprises a powder, dry material, paste, gel, viscous liquid or liquid. This broad use of contemplated holder arrangements is primarily based on the fact that the holder arrangement is kept on the side of the inside of the container and stays stable with respect to the contents, because it is not being stored on the lid or on the lip of the container. The handle portion of the scoop or dispenser is coupled with the scoop or dispenser holder, such that the portion of the handle that is grasped by the consumer does not fall below the top layer of product. Obviously, this new design solves the issue of a consumer having to dig around in the product with his or her hands to find the scoop.

Thus, specific embodiments of integrated product scoops or dispenser holders or clips, methods of production and uses thereof have been disclosed. It should be apparent, however, to those skilled in the art that many more modifications besides those already described are possible without departing from the inventive concepts herein. The inventive subject matter, therefore, is not to be restricted except in the spirit of the disclosure herein. Moreover, in interpreting the specification and claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

We claim:

1. An integrated product scoop or dispenser holder arrangement, consisting of:
   a container for retaining product, wherein the container comprises a body component having an interior surface, an exterior surface, a top, a bottom, an opening in or near the top of the container and a lid,
   a product retained in the container,
   an integrated product scoop or dispenser holder that is physically integrated into the material used to form the container, is located as a part of the interior surface of the container, is not located as a part of a lid for the container, comprises a directional channel formed by two parallel arms, and is designed to grasp or actively secure a scoop or dispenser,
   a scoop or dispenser having a handle portion, wherein the handle portion is releasably held in the directional channel formed by two parallel arms in order to form the integrated product scoop or dispenser holder arrangement, and
   a backstop coupled to one of the parallel arms that further secure the scoop from being removed or pulled forward from the directional channel until actively removed past or pulled past the backstop by the consumer.

2. The integrated product scoop or dispenser holder arrangement of claim 1, wherein the product may comprise a powder, dry material, paste, gel, viscous liquid or liquid.

3. The integrated product scoop or dispenser holder arrangement of claim 1, wherein the holder is integrally molded as a part of the container when the container is formed.

4. The integrated product scoop or dispenser holder arrangement of claim 1, wherein the holder comprises at least one type of material.

5. The integrated product scoop or dispenser holder arrangement of claim 1, wherein the holder comprises plastic, metal, cardboard, coated materials, layered materials or a combination thereof.

6. The integrated product scoop or dispenser holder arrangement of claim 1, wherein the holder comprises plastic.

7. The integrated product scoop or dispenser holder arrangement of claim 1, wherein the holder is intentionally located above the product, product line or combination there.

8. A product scoop or dispenser holder arrangement, consisting of:
   an integrated product scoop or dispenser holder that is physically integrated into a material used to form a product container, is located as a part of an interior surface of the container, comprises a directional channel formed by two parallel arms, is not located as a part of a lid for the container, and is designed to hold a scoop or dispenser, and
   a scoop or dispenser having a handle portion, wherein the handle portion is releasably held in the directional channel formed by two parallel arms in order to form the integrated product scoop or dispenser holder arrangement, and
a backstop coupled to one of the parallel arms that further secure the scoop from being removed or pulled forward from the directional channel until actively removed past or pulled past the backstop by the consumer.

9. The integrated product scoop or dispenser holder of claim 8, wherein the holder may be aligned in a flat orientation with respect to the interior surface of the product container.

10. The integrated product scoop or dispenser holder of claim 8, wherein the holder may be aligned in a vertical orientation with respect to the interior surface of the product container.

11. The integrated product scoop or dispenser holder arrangement of claim 8, wherein the holder comprises at least one type of material.

12. The integrated product scoop or dispenser holder arrangement of claim 8, wherein the holder comprises plastic, metal, cardboard, coated materials, layered materials or a combination thereof.

13. The integrated product scoop or dispenser holder arrangement of claim 8, wherein the directional channel is formed from two parallel solid pieces of material separated at a fixed gap, wherein the gap is a part of the directional channel.

14. The integrated product scoop or dispenser holder arrangement of claim 8, wherein the directional channel is formed from two parallel solid pieces of material that are made from plastic.

* * * * *